(12) United States Patent
Conato et al.

(10) Patent No.: US 10,407,312 B2
(45) Date of Patent: Sep. 10, 2019

(54) ONE-STEP METHOD FOR THE SYNTHESIS OF HIGH SILICA CONTENT ZEOLITES IN ORGANIC-FREE MEDIA

(71) Applicant: UNIVERSITY OF HOUSTON SYSTEM, Houston, TX (US)

(72) Inventors: Marlon T. Conato, Pearland, TX (US); Matthew D. Oleksiak, Houston, TX (US); Jeffrey D. Rimer, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 125 days.

(21) Appl. No.: 15/511,776

(22) PCT Filed: Sep. 17, 2015

(86) PCT No.: PCT/US2015/050728
§ 371 (c)(1),
(2) Date: Mar. 16, 2017

(87) PCT Pub. No.: WO2016/044615
PCT Pub. Date: Mar. 24, 2016

(65) Prior Publication Data
US 2017/0247261 A1    Aug. 31, 2017

Related U.S. Application Data

(60) Provisional application No. 62/051,426, filed on Sep. 17, 2014, provisional application No. 62/175,633, filed on Jun. 15, 2015.

(51) Int. Cl.
C01B 39/14    (2006.01)
C01B 39/20    (2006.01)
(Continued)

(52) U.S. Cl.
CPC ............... *C01B 39/46* (2013.01); *B01J 29/08* (2013.01); *B01J 29/084* (2013.01); *B01J 29/085* (2013.01);
(Continued)

(58) Field of Classification Search
CPC ......... C01B 29/14; C01B 29/20; C01B 29/24; B01J 37/10; B01J 29/08; B01J 29/084;
(Continued)

(56) References Cited

U.S. PATENT DOCUMENTS 2,882,244 A    4/1959   Milton
2,982,612 A    5/1961   Barrer et al.
(Continued)

FOREIGN PATENT DOCUMENTS

WO    WO-2012054287 A2    4/2012

OTHER PUBLICATIONS

Martinez, C.; Corma, A. Coordin. Chem. Rev. 2011, 255, 1558-1580.
(Continued)

*Primary Examiner* — David M Brunsman
(74) *Attorney, Agent, or Firm* — Winstead PC

(57) ABSTRACT

In an embodiment, the present disclosure pertains to a composition comprising a zeolite with high silica content. In some embodiments, the silica to aluminum ratio (SAR) for the zeolite is 2:1. In some embodiments, the zeolite comprises Zeolite HOU-2 (LTA-type). In some embodiments, the silica to aluminum ratio (SAR) for the zeolite is >3. In some embodiments, the zeolite comprises Zeolite HOU-3 (FAU type). In some embodiments, the zeolite is synthesized using a one-step method. In some embodiments, the zeolite is synthesized without the use of an organic structure-directing agent (OSDA). In some embodiments, the zeolite is synthesized without the use of post-synthesis dealumina-
(Continued)

tion. In some embodiments, the zeolite is synthesized without the use crystal seeds. In some embodiments, the zeolite is used in commercial ion exchange. In some embodiments, the zeolite is used for catalysis reaction. In some embodiments, the zeolite is highly thermostable.

28 Claims, 15 Drawing Sheets

(51) Int. Cl.

| | | |
|---|---|---|
| *B01J 29/08* | (2006.01) | |
| *B01J 29/70* | (2006.01) | |
| *B01J 37/10* | (2006.01) | |
| *C01B 39/46* | (2006.01) | |
| *C01B 39/24* | (2006.01) | |
| *B01J 37/00* | (2006.01) | |
| *B01J 37/04* | (2006.01) | |
| *B01J 39/02* | (2006.01) | |
| *B01J 39/14* | (2006.01) | |

(52) U.S. Cl.
CPC ........... *B01J 29/70* (2013.01); *B01J 29/7003* (2013.01); *B01J 29/7049* (2013.01); *B01J 37/009* (2013.01); *B01J 37/0072* (2013.01); *B01J 37/04* (2013.01); *B01J 37/10* (2013.01); *B01J 39/02* (2013.01); *B01J 39/14* (2013.01); *C01B 39/14* (2013.01); *C01B 39/20* (2013.01); *C01B 39/24* (2013.01); *C01P 2004/32* (2013.01); *C01P 2004/38* (2013.01); *C01P 2004/61* (2013.01); *C01P 2004/62* (2013.01)

(58) Field of Classification Search
CPC ............... B01J 29/7003; C01P 2004/32; C01P 2004/38; C01P 2004/61; C01P 2004/62
See application file for complete search history.

(56) References Cited

U.S. PATENT DOCUMENTS

| | | | |
|---|---|---|---|
| 3,058,805 | A | 10/1962 | Horst |
| 3,130,007 | A | 4/1964 | Breck |
| 3,391,994 | A | 7/1968 | Haden, Jr. et al. |
| 3,506,400 | A | 4/1970 | Eberly, Jr. et al. |
| 3,574,538 | A | 4/1971 | Mcdaniel et al. |
| 3,574,539 | A | 4/1971 | Domine |
| 3,594,121 | A | 7/1971 | Weber |
| 3,595,611 | A | 7/1971 | Mcdaniel |
| 3,639,099 | A | 2/1972 | Elliott, Jr. et al. |
| 3,640,681 | A | 2/1972 | Pickert |
| 3,671,191 | A | 6/1972 | Maher et al. |
| 3,690,823 | A | 9/1972 | Young |
| 3,691,099 | A | 9/1972 | Young |
| 3,920,798 | A | 11/1975 | Weber |
| 3,929,672 | A | 12/1975 | Ward |
| 4,073,867 | A | 2/1978 | Roebke et al. |
| 4,078,042 | A | 3/1978 | Leach |
| 4,093,560 | A | 6/1978 | Kerr et al. |
| 4,178,352 | A | 12/1979 | Vaughan et al. |
| 4,218,307 | A | 8/1980 | McDaniel |
| 4,235,856 | A | 11/1980 | Kostinko |
| 4,257,885 | A | 3/1981 | Grose et al. |
| 4,533,533 | A | 8/1985 | Dewing et al. |
| 4,534,947 | A | 8/1985 | Vaughan |
| 4,576,807 | A | 3/1986 | Loechelt, II |
| 4,608,236 | A | 8/1986 | Strack et al. |
| 4,711,770 | A | 12/1987 | Skeels et al. |
| 4,931,267 | A | 6/1990 | Vaughan et al. |
| 4,965,059 | A | 10/1990 | Vaughan |
| 5,098,686 | A | 3/1992 | Delprato et al. |
| 5,785,944 | A | 7/1998 | Miller |
| 6,284,218 | B1 | 9/2001 | Kuvettu et al. |
| 6,787,123 | B2 | 9/2004 | Du et al. |
| 7,014,837 | B2 | 3/2006 | Corbin et al. |
| 8,337,808 | B1 | 12/2012 | Burton, Jr. et al. |
| 8,545,804 | B2 | 10/2013 | Burton et al. |
| 8,778,824 | B2 | 7/2014 | Lai et al. |
| 8,852,326 | B2 | 10/2014 | Wang et al. |
| 8,882,993 | B2 | 11/2014 | Lai et al. |
| 2017/0247261 | A1* | 8/2017 | Conato ............... B01J 29/7049 |

OTHER PUBLICATIONS

Wang, Q. A.; Luo, J. Z.; Zhang, Z. Y.; Borgna, A. Energy Environ. Sci. 2011, 4, 42-55.
Kubota, Y.; Helmkamp, M. M.; Zones, S. I.; Davis, M. E. Micropor. Mater. 1996, 6, 213-229.
Lobo, R. F.; Zones, S. I.; Davis, M. E. J. Inclus. Phenom. Mol. 1995, 21, 47 [Preview Only].
Maldonado, M.; Oleksiak, M. D.; Chinta, S.; Rimer, J. D. J. Am. Chem. Soc. 2013, 135, 2641-2652.
Šefčík, J.; McCormick, A. V. Chem. Eng. Sci. 1999, 54, 3513-3519.
Lupulescu, A. I.; Kumar, M.; Rimer, J. D. J. Am. Chem. Soc. 2013, 135, 6608-6617.
Itani, L.; Bozhilov, K. N.; Clet, G.; Delmotte, L.; Valtchev, V. Chem.-Eur. J. 2011, 17, 2199-2210.
Cundy, C. S.; Cox, P. A. Chem. Rev. 2003, 103, 663-701.
Conato, M. T.; Oleksiak, M. D.; Peter McGrail, B.; Motkuri, R. K.; Rimer, J. D. Chem. Commun. 2015, 51, 269.
Vermeiren, W.; Gilson, J. P. Top. Catal. 2009, 52, 1131-1161.
Breck, D. W.; Eversole, W. G.; Milton, R. M. J. Am. Chem. Soc. 1956, 78, 2338.
Dougnier, F.; Patarin, J.; Guth, J. L.; Anglerot, D. Zeolites 1992, 12, 160.
Zhu, L. F.; Ren, L. M.; Zeng, S. J.; Yang, C. G.; Zhang, H. Y.; Meng, X. J.; Rigutto, M.; van der Made, A.; Xiao, F. S. Chem. Commun. 2013, 49, 10495.
Kerr, G. T. J. Phys. Chem. 1968, 72, 7, 2594.
Wormsbecher, R.; Wu-Cheng, C.; Wallenstein, D. Grace Catalagram 2010, 108, 19.
Koroglu, H. J.; Sarioglan, A.; Tattier, M.; Erdem-Senatalar, A.; Savasci, O. T. J. Cryst. Growth. 2002, 241, 481-488.
Oleksiak, M. D.; Rimer, J. D. Rev. Chem. Eng. 2014, 30, 1, 1-49.
Ng, E.-P.; Chateigner, D.; Bein, T.; Valtchev, V.; Mintova, S. Science 2012, 335, 70.
Zhang, L.; Liu, S. L.; Xie, S. J.; Xu, L. Y. Micropor. Mesopor. Mater. 2012, 147, 117-126.
Ren, L. M.; Wu, Q. M.; Yang, C. G.; Zhu, L. F.; Li, C. J.; Zhang, P. L.; Zhang, H. Y.; Meng, X. J.; Xiao, F. S. *J. Am. Chem. Soc.* 2012, 134, 15173-15176.
A. Corma, F. Rey, J. Rius, M. J. Sabater and S. Valencia, Nature, 2004, 431, 287.
G. J. Lewis, M. A. Miller, J. G. Moscoso, B. A. Wilson, L. M. Knight and S. T. Wilson, Stud Surf Sci Catal, 2004, 154, 364-372.
G. T. Kerr, Inorg Chem, 1966, 5, 1537-1539.
G. H. Kuhl, Inorg Chem, 1971, 10, 2488-2495.
Y. Bouizi, J. L. Paillaud, L. Simon and V. Valtchev, Chem Mater, 2007, 19, 652-654.
International Zeolite Association, www.iza-structure.org/databases/ <http://www.iza-structure.org/databases/>.
Zeolyst International, <http://www.zeolyst.com/our-products.aspx>.
Khan. G. M. Arifuzzaman et al., "Linde type-A zeolite synthesis and effect of crystallization on its surface acidity," Indian Journal of Chemical Technology, Jul. 2010, val. 17, pp. 303-308.
Imai, Hiroyuki eta!., "Direct crystallization of CHA-type zeal i te from amorphous aluminosilicate gel by seed-assisted method in the absence of organic-structure-directing agents," Microporous and Mesoporous Materials Jun. 5, 2014 (Online), vol. 196, pp. 341-348.
Kubota, Yoshihiro et al., "Effective fabrication of catalysts from large pore, multidimensional zeolites synthesized without using organic structuredirecting agents," Chemistry of Materials, Jan. 3, 2014 (Online), vol. 26, pp. 1250-1259.
Barrer, R. M.; White, E. A. D. J. Chem. Soc. 1952, 1561.

* cited by examiner

ONE-STEP METHOD FOR THE SYNTHESIS OF HIGH SILICA CONTENT ZEOLITES IN ORGANIC-FREE MEDIA

CROSS REFERENCE TO RELATED APPLICATION

This application claims priority to U.S. Provisional Application No. 62/051,426 filed on Sep. 17, 2014 and U.S. Provisional Application No. 62/175,633 filed on Jun. 15, 2015. The entireties of the aforementioned applications are incorporated herein by reference.

STATEMENT REGARDING FEDERALLY SPONSORED RESEARCH

The present invention was supported, in whole or in part, by supported by the National Science Foundation (CAREER 1151098), the Norman Hackerman Advanced Research Program (003652-0024-2011), and the Welch Foundation (Award E-1794). The Government has certain rights in this invention.

BACKGROUND

Zeolites are beneficial for numerous industrial applications such as catalysis, ion-exchange, and adsorption. The economic and environmental disadvantages of using organic structure-directing agents (OSDAs) in the preparation of commercial zeolites have motivated research for viable alternatives. Many OSDAs employed in zeolite synthesis are either expensive or not commercially available, and also require post-synthesis calcination to remove organic molecules occluded within zeolite pores a process that negates recycling of organics. The drawbacks of OSDA-free synthesis, however, are the prohibitively small range of zeolite Si/Al ratio (SAR) and the propensity for polymorphism (i.e., the formation of crystal impurities). Moreover, only less than 15% of the total reported zeolite framework types have been prepared without the use of OSDAs. Therefore, the ability to prepare zeolites with desired physicochemical properties in the absence of organics is challenging, but has significant promise for commercial realization. Hence, there exists a need in the art to develop methods of synthesizing zeolites without the use of complex and costly OSDAs.

SUMMARY

In an embodiment, the present disclosure pertains to a composition comprising a zeolite with high silica content. In some embodiments, the silica to aluminum ratio (SAR) for the zeolite is about 2:1. In some embodiments, the zeolite comprises Zeolite HOU-2 (LTA type). In some embodiments, the zeolite is synthesized using a one-step method. In some embodiments, the silica to aluminum ratio (SAR) for the zeolite is at least 3. In some embodiments, the zeolite comprises Zeolite Y (FAU type) or high-silica HOU-3 (Na-FAU). In some embodiments, the zeolite is synthesized without the use of an organic structure-directing agent (OSDA). In some embodiments, the zeolite is synthesized without the use of post-synthesis dealumination. In some embodiments, the zeolite is synthesized without the use crystal seeds. In some embodiments, the zeolite is synthesized using a one-step method. In some embodiments, the zeolite has a rare earth element occlusion as the extra-framework cation. In some embodiments, the rare earth metal is cerium or lanthanum. In some embodiments, the zeolite is used in commercial ion exchange. In some embodiments, the zeolite is used for catalysis reaction. In some embodiments, the zeolite is highly thermostable.

In some embodiments, the present disclosure relates to a one-step method for the synthesis of LTA-type zeolites. In some embodiments, the method comprises preparing a zeolite growth solution comprising an alumina source and a hydroxide source. In some embodiments such a method further comprises adding a silica source to the zeolite growth solution to form an initial gel mixture. In some embodiments, such a method comprises using a cation as the extra-framework counterion. In some embodiments, the extra framework counterion comprises multivalent ions. In some embodiments, the multivalent ions comprise alkaline earth metals or transition metals. In some embodiments, the cation comprises alkali metals. In some embodiments, the extra-framework cation is $Na^+$. In some embodiments, the method comprises crystallization of the initial gel mixture. In some embodiments, the step of crystallization comprises heating the initial gel mixture from about 25° C. to about 100° C. In some embodiments, the mixture is heated for at least 7 days. In some embodiments the method comprises collecting products formed, where the products comprise of crystalline material and amorphous material. In some embodiments, the method comprises isolating the zeolites formed from the crystalline products. In some embodiments, the LTA-type zeolites synthesized utilizing the methods disclosed herein have a silicon-to-aluminum ratio of about 2:1.

In some embodiments, the present disclosure relates to a one-step method for the synthesis of FAU-type zeolites. In some embodiments, the method comprises preparing a zeolite growth solution comprising an alumina source and a hydroxide source. In some embodiments such a method further comprises adding a silica source to the zeolite growth solution to form an initial gel mixture. In some embodiments, such a method comprises using a cation as the extra-framework counterion. In some embodiments, the extra framework counterion comprises multivalent ions. In some embodiments, the multivalent ions comprise alkaline earth metals or transition metals. In some embodiments, the cation comprises alkali metals. In some embodiments, the extra framework cation is $Na^+$. In some embodiments, the method comprises using an initial gel mixture comprising Si/OH of a molar ratio greater than about 1.5. In some embodiments, the method comprises crystallization of the initial gel mixture. In some embodiments, the step of crystallization comprises heating the initial gel mixture at about 100° C. for at least 1 day. In some embodiments, the step of crystallization comprises heating the initial gel mixture at about 100° C. for about 3 days. In some embodiments, the step of crystallization comprises heating the initial gel mixture at about 140° C. for at least 1 day. In some embodiments, the step of crystallization comprises heating the initial gel mixture at about 140° C. for about 3 days. In some embodiments the method comprises collecting products formed, where the products comprise of crystalline material and amorphous material. In some embodiments, the method comprises isolating the zeolites formed from the crystalline products. In some embodiments, the synthesized FAU-type zeolite has silicon to aluminum ratio (SAR) of at least 3.

In some embodiments of the present disclosure, the silica is selected from the group consisting of fumed silica, sodium silicate, tetraethylorthosilicate (TEOS), colloidal silica, natural silicon dioxide-containing clays and minerals, or zeolites. In some embodiment, the silica is colloidal silica.

In some embodiments, the colloidal silica has a size ranging from about 8 nm to about 25 nm.

In some embodiments of the present disclosure, the alumina source is selected from the group consisting of aluminum sulfate, aluminum isopropoxide, aluminum metal, alumina, natural $Al_2O_3$ containing clays and minerals, sodium aluminate, or zeolites. In some embodiments, the alumina source is sodium aluminate.

In some embodiments the present disclosure pertains to a method of synthesizing zeolites without the use of organic structure-directing agents. In some embodiments, the zeolite is synthesized without the use of post-synthesis dealumination. In some embodiments, the zeolite is synthesized without the use crystal seeds.

In some embodiments, the step of crystallization of the zeolite comprises heating the initial gel mixture to temperatures ranging from about 70° C. to about 290° C. In some embodiments, the step of crystallization of the zeolite comprises heating the initial gel mixture to temperatures ranging from about 25° C. to about 70° C. In some embodiments, the step of crystallization of the zeolite comprises heating the initial gel mixture to temperatures ranging from about 25° C. to about 140° C. In some embodiments, the zeolites synthesized by the methods disclosed herein have a cubic morphology. In some embodiments, the zeolites synthesized by the methods disclosed herein have a spheroidal morphology. In some embodiments, the size of the zeolites synthesized by the methods disclosed herein ranges from about 1 nm to about 3 μM.

In some embodiments, the method comprises synthesizing the zeolites at a high temperature. In some embodiments, the temperature of synthesis is about 100° C. In some embodiments, the temperature of synthesis is 140° C. In some embodiments, the method further comprises incorporation of a rare earth metal in the synthesized zeolite. In some embodiments, the rare earth metal is cerium or lanthanum. In some embodiments, the method comprises incorporation of multivalent ions in the synthesized zeolite. In some embodiments, the multivalent ions comprise alkali earth metals or transition metals. In some embodiments, the size of the zeolites synthesized by the methods disclosed herein ranges from about 1-5 μm (as verified by electron microscopy).

BRIEF DESCRIPTION OF THE DRAWINGS

(FIG. 2A) and 100° C. (FIG. 2B). Samples were isolated from growth solutions at periodic times (labelled) during the synthesis.

DETAILED DESCRIPTION

Figure 1:
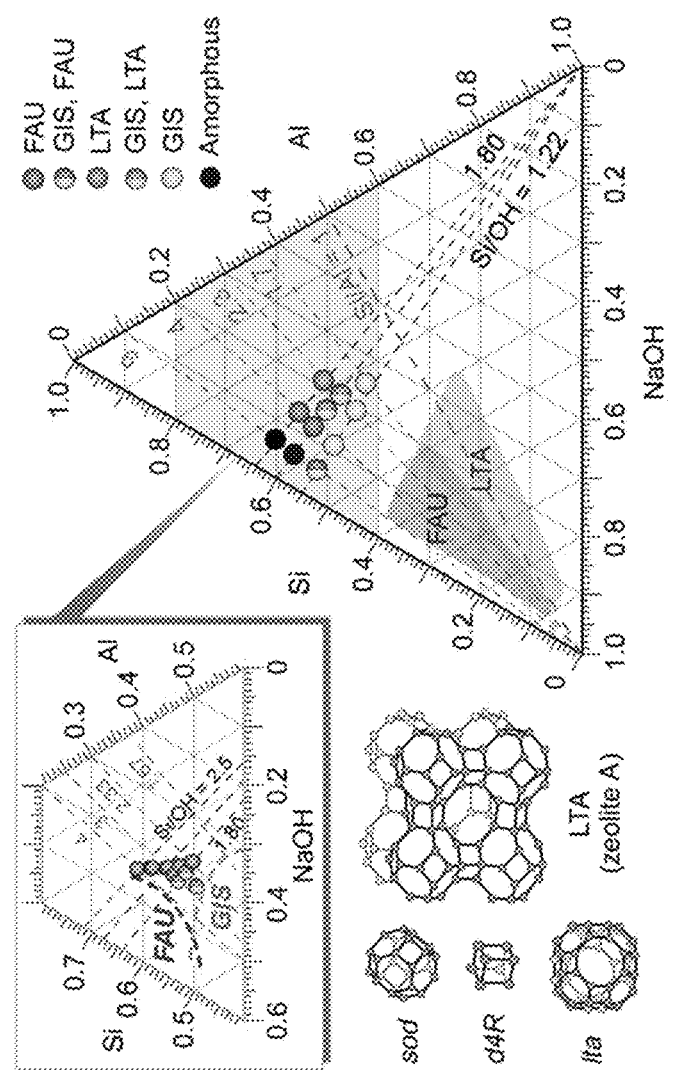
FIG. 1 depicts a ternary phase diagram of zeolites prepared at high Si/OH and Si/Al molar ratios in OSDA-free conditions. Each data point corresponds to crystals isolated from growth solutions after hydrothermal treatment at 100° C. for 7 days. The blue and red shaded regions in the lower left corner of the diagram refer to the formation of FAU and LTA, respectively, in growth solutions heated at 65° C. for 7 days. An enlarged segment of the grey shaded region (upper left figure) shows pure LTA and binary LTA/GIS phases. Structures presented in the bottom left highlight the LTA crystal topology, which is comprised of three secondary building units: double-4-membered rings (d4R), sodalite cages (sod), and LTA cages (lta).

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes only and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

The following terms will be used throughout the specification and will have the following meanings unless otherwise indicated.

The terms "active source" or "source" mean a reagent or precursor material capable of supplying an element in a form that can react and be incorporated into the zeolite structure. The terms "source" and "active source" are used interchangeably herein.

Unless otherwise specified, the recitation of a genus of elements, materials or other components, from which an individual component or mixture of components can be selected, is intended to include all possible sub-generic combinations of the listed components and mixtures thereof.

Also, "include" and its variants, are intended to be non-limiting, such that recitation of items in a list is not to the exclusion of other like items that may also be useful in the materials, compositions and methods of this invention.

Zeolites are crystalline aluminosilicate compositions that are microporous and that are formed from corner sharing $AlO_2$ and $SiO_2$ tetrahedra. Numerous zeolites, both naturally occurring and synthetically prepared are used in various industrial processes. Synthetic zeolites are prepared via hydrothermal synthesis employing suitable sources of Si, Al and structure directing agents such as alkali metals, alkaline earth metals, amines, or organoammonium cations. The structure-directing agents reside in the pores of the zeolite and are largely responsible for the particular structure that is ultimately formed. These species balance the framework charge associated with aluminum and can also serve as space fillers. The global synthetic zeolite industry accounts for approximately $1.9 billion in revenue annually. Zeolites are characterized by having pore openings of uniform dimensions, having a significant ion exchange capacity, and their ability to adsorb and reversibly desorb an adsorbed phase that is dispersed throughout the internal voids of the crystal without significantly displacing any atoms that make up the permanent zeolite crystal structure.

There are over 200 zeolite framework types that have been assigned three letter codes by the International Zeolite Association (IZA). The majority of synthetically-realized structures require the use of an organic structure-directing agent (OSDA), which typically possesses a size and shape commensurate with the channels/cages of the structure, and therefore helps facilitate the formation of the crystal structure. The use of OSDAs has several disadvantages. Many organics are not commercially available, or are expensive to manufacture. Moreover, organic molecules are occluded within zeolite pores and must be removed post-synthetically by calcination, thereby rendering the organic irrecoverable and increasing synthesis cost while potentially causing the release of environmentally unfriendly or hazardous gases. For these reasons it is desirable to develop OSDA-free synthesis routes to produce widely-used zeolites in economically viable ways; however, it is challenging to control crystalline phase purity, crystal morphology, and the chemical properties of the zeolite (e.g., acidity) without the use of an OSDA.

Zeolites are commonly used as catalysts in petroleum refining and chemicals production, and are highly active in the selective catalytic reduction of diesel and lean-burn vehicle emissions. Moreover, zeolites are commonly used for ion-exchange and are promising materials for selective separations. Research in both industry and academia seeks to design more rational synthetic approaches capable of improving zeolite properties for existing petrochemical processes, for emerging applications (such as NO, reduction in diesel emission), and for research objectives aimed to expand zeolite application to non-conventional markets, such as sensor technologies, drug delivery, and enantioselective catalysis and separations.

Zeolites having the LTA framework topology defined by the connectivity of the tetrahedral atoms (referred to herein simply as LTA) are known. See, for example, Ch. Baerlocher et al., Atlas of Zeolite Framework Types, 6th Revised Edition, 2007 of the International Zeolite Association. LTA is extensively used commercially as an ion exchange material; however its broader applicability to catalysis has been hindered by its acidity (high aluminum content), which leads to rapid deactivation and reduced hydrothermal stability. Notably, LTA is prepared in Al-rich growth solutions forming crystals with Si-to-Al molar ratio (SAR) of approximately 1. Attempts to increase the SAR with the use of OSDAs have been demonstrated; however, achieving similar ends by a single step organic-free route remain elusive. It would be desirable to find a way to eliminate the use of complex and costly OSDAs in the synthesis of LTA-type zeolites.

Zeolite Y (FAU) is extensively used as a commercial catalyst. The main application is oil cracking in refineries and each process requires specific silica and aluminium content, denoted by the silicon-to-aluminium molar ratio (Si/Al or SAR). Initially, FAU was synthesized as zeolite X with a silicon-to-aluminium ratio (SAR) of 1.0 to 1.5. The low SAR limited the effectiveness of these zeolites due to poor hydrothermal stability and rapid deactivation of the catalyst due to the high aluminium content. These factors led to increased research efforts aimed at synthesizing FAU with higher SAR, without the use of OSDAs or any post-synthesis treatment, for e.g., dealumination by acid treatment, resulting in the synthesis of zeolite Y with a SAR of ~2.5. There has seemingly been an upper limit to the SAR of FAU zeolite that can be achieved by OSDA-free syntheses. In order to increase the SAR, researchers have utilized numerous OSDAs as well as post-synthesis methods to remove framework aluminium, such as steam or acid treatment of the crystalline product. Using these methods, it is possible to obtain more siliceous FAU with SAR values greater than 2.5. These materials are referred to as ultrastable Y (USY).

Post-synthesis treatment to remove aluminium has disadvantages, notably the added steps of calcination and treatment leading to increased manufacturing cost. Additionally, the structural integrity of the zeolite is often compromised after dealumination by either steam or acid treatment. The zeolite component of catalyst formulations typically contains a rare-earth (RE) exchanged zeolite Y. Any loss of structure limits the RE uptake capacity to ca. 3-4 wt %. The introduction of RE as extra-framework cations increases the stability of the catalyst and reduces dealumination under cracking conditions. These methods provide greater stability for the active zeolite component of FCC catalysts but a one-step synthesis without an OSDA could significantly reduce the costs associated with catalyst production.

Applicants disclose zeolite formulations manufactured by a single step organic free route that completely eliminates the use of complex and costly OSDAs. Applicants have named the zeolite formulation disclosed herein HOU-2 (LTA-type zeolite) and HOU-3 (FAU-type zeolite).

In an embodiment, the present disclosure pertains to a composition comprising a zeolite with high silica content. In some embodiments, the zeolite is synthesized without the use of an organic structure-directing agent (OSDA). In some embodiments, the zeolite is synthesized without the use of post-synthesis dealumination. In some embodiments, the zeolite is synthesized without the use of crystal seeds. In some embodiments, the zeolite has a rare earth element occlusion. In some embodiments, the rare earth metal is cerium or lanthanum. In some embodiments, the zeolite is used in commercial ion exchange. In some embodiments, the zeolite is used for catalysis reaction. In some embodiments, the zeolite is highly thermostable.

In an embodiment, the present disclosure, pertains to a zeolite (zeolite HOU-2) (LTA type) prepared with the highest silica content (Si/Al=2.1) reported for Na$^+$-LTA zeolites without the use of an organic structure-directing agent. In some embodiments, the present disclosure pertains to a process to prepare LTA material with a final product SAR$_{(s)}$>2. The rational design of Si-rich zeolites has the potential to improve thermal stability and extend their applicability to a wider range of operating conditions.

In some embodiments, the present disclosure pertains to the use of Si—Al—NaOH ternary kinetic phase diagram as a guide to establish regions of high silica LTA formation. A method for identifying polymorphism in OSDA-free zeolite synthesis is the construction of kinetic (ternary) phase diagrams, which map the phase(s) of crystals formed at varying molar fraction of each principle reagent (Si, Al, OH$^-$). These diagrams were initially introduced by Breck and Flanigen and were recently used by Maldonado et al., to explore the formation of multiple zeolite framework types. Crystal phase transformations in zeolite synthesis that are governed by Ostwald's rule of stages, which is an empirical phenomenon wherein materials first form metastable structures and then transform to more thermodynamically stable structures with time, has been observed. The two most common metastable structures are LTA (zeolite A) and FAU (zeolite X or Y). LTA is extensively used in commercial ion exchange; however, its broader applicability to catalysis has been hindered by high Al content (i.e., acidity), which engenders rapid deactivation and poor hydrothermal stability. LTA is most commonly prepared in Al-rich growth solutions (FIG. 1, shaded region), forming crystals with Si-to-Al ratio (SAR)≈1.

The LTA framework does not form structures with SAR<1 in accordance with Loewenstein's rule. It is also difficult to prepare LTA with SAR>1. Prior work has demonstrated that higher SAR can be achieved through the use of OSDAs, seeded growth, or post-synthesis dealumination; however, achieving similar ends by a single step OSDA-free route remains elusive. For instance, attempts to alter the SAR by increasing the silica content of the growth solution often leads to the formation of FAU (FIG. 1, Si-rich regions). Likewise, an increase in synthesis temperature promotes structural transformations to polymorphs, such as zeolite P (GIS), sodalite (SOD), cancrinite (CAN), and others.

In some embodiments, the present disclosure relates to a one-step method for the synthesis of LTA type zeolites. In some embodiments, the method comprises synthesizing zeolites without the use of organic structure-directing agents. In some embodiments, the zeolite is synthesized without the use of post-synthesis dealumination. In some embodiments, the zeolite is synthesized without the use crystal seeds. In some embodiments, the method comprises preparing a zeolite growth solution comprising an alumina source and a hydroxide source. In some embodiments such a method further comprises adding a silica source to the zeolite growth solution to form an initial gel mixture. In some embodiments the initial gel mixture comprises Si/OH ratio greater than 1. In some embodiments, such a method comprises using a cation as the extra-framework counterion. In some embodiments, the cation comprises alkali metals. In some embodiments, the extra framework cation is Na$^+$. In some embodiments, the method comprises crystallization of the initial gel mixture. In some embodiments, the step of crystallization comprises heating the initial gel mixture from about 25° C. to about 100° C. In some embodiments, the mixture is heated for at least 7 days. In some embodiments the method comprises collecting products formed, where the products comprise of crystalline material and amorphous material. In some embodiments of the present disclosure, the method comprises isolating the zeolites formed from the crystalline products. In some embodiments, the LTA-type zeolites synthesized utilizing the methods disclosed herein have a silicon-to-aluminum ratio of about 2:1.

In some embodiments, the zeolites are crystallized at a low temperature. In some embodiments, the temperature of crystallization ranges from about 70° C. to about 290° C. In some embodiments, the temperature of crystallization ranges from about 25° C. to about 70° C.

In some embodiments, the temperature of crystallization ranges from about 25° C. to about 100° C. In some embodiments, the temperature of crystallization ranges from about 25 to about 140.

In some embodiments, the zeolites synthesized by the methods disclosed herein have a cubic morphology. In some embodiments, the zeolites synthesized by the methods disclosed herein have a spheroidal morphology. In some embodiments, the size of the zeolites synthesized by the methods disclosed herein ranges from about 1 nm to about 3 μM. In some embodiments, the present disclosure relates to a LTA product with the highest SAR obtained by a one-step OSDA-free method.

In some embodiments, crystallization at about 100° C., with an initial gel mixture having a SAR of 4 yields zeolite Y (FAU) while a starting mixture with Si/OH<1.5 yields zeolite P (GIS). In some embodiments, products collected at a crystallization temperature of about 100° C. results in mixed crystalline and amorphous components, with the latter being a minor fraction that is easily removed by filtration.

In some embodiments, HOU-2 was prepared with $Na^+$ as the extra framework cation, colloidal silica (LUDOX AS-40), and sodium aluminate. Zeolite A is typically synthesized at low temperature (25-70° C.). For example, the red/blue shaded regions in FIG. 1 refer to 7-day syntheses at 65° C. Increasing the temperature to 100° C. results in phase transformations LTA→SOD and FAU→GIS. The edge of the GIS phase region is shown in FIG. 1. Interestingly, upon extending the kinetic phase diagram to less alkaline growth solutions (Si/OH≥1.8), Applicants observed the formation of LTA within the Si-rich region. Moreover, regions with FAU, GIS/LTA, and GIS/FAU phases were also observed. Attempts to synthesize zeolites with growth solutions having Si/Al molar ratios above 4 yielded an amorphous product (FIG. 1, black symbols), suggesting an upper limit of the phase diagram. An enlarged section of the ternary diagram (FIG. 1, inset) highlights the region of pure LTA and binary LTA/GIS.

Figures 2A, 2B:
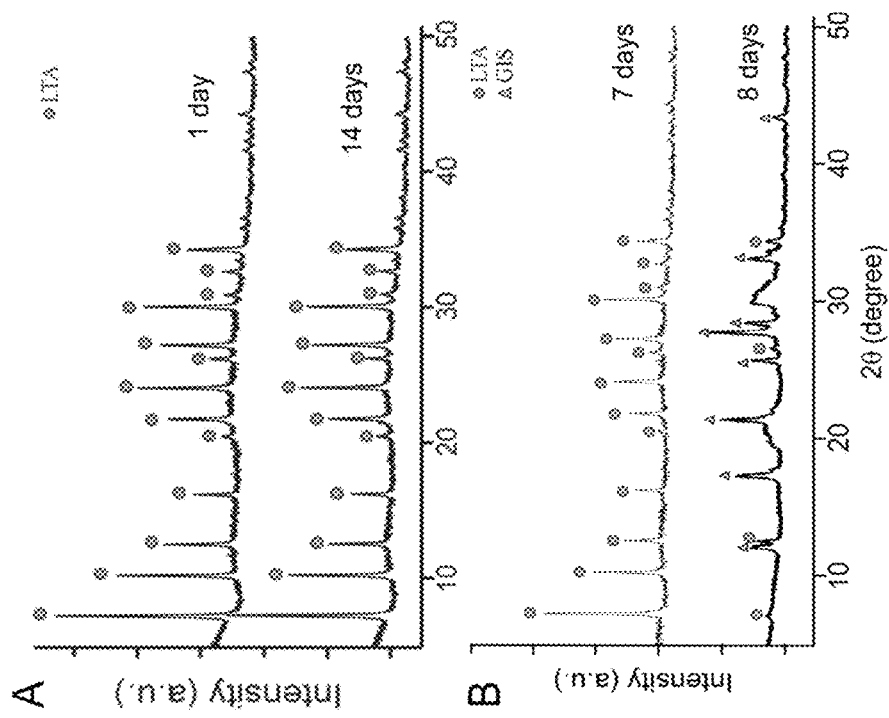
FIGS. 2A-2B show powder XRD patterns of HOU-2 (Na-LTA) prepared from a growth solution with molar composition 18 $SiO_2$:3.9 $Al_2O_3$:5 $Na_2O$:173 $H_2O$ that was heated at the following temperatures: 65° C.

FIG. 2 shows representative powder X-ray diffraction (XRD) patterns of HOU-2 prepared at different temperatures and times. Synthesis at 65° C. (FIG. 2A) revealed crystalline HOU-2 within 1 day; and after 14 days of heating no structural transformations were noticed. The metastability of HOU-2 was tested at a higher synthesis temperature (100° C.) and revealed that pure HOU-2 was stable for up to 7 days (FIG. 2B), beyond which the onset of a LTA-to-GIS phase transformation was observed. The percentage of GIS increased with longer heating time; however, after 14 days of heating a LTA/GIS binary mixture (FIG. 4) was still observed.

The total mass of HOU-2 after drying at ambient conditions is ca. 9 g per 20 mL of initial growth solution. The nominal composition used to prepare LTA growth solutions produced a viscous gel at room temperature, which may pose challenges for commercial scale-up. To this end, Applicants investigated the influence of $H_2O$ content to ascertain if the viscosity of the fluid could be reduced. Indeed, the percentage of water could be increased by a factor of three without sacrificing phase purity (Table 1). As expected, there is a reduction in the yield of crystalline product with increased water content. More importantly, dilution only produced a slight decrease in the SAR of HOU-2 (i.e., from 2.1 to 1.7).

TABLE 1

Preparation of HOU-2 at different conditions.

| | T (° C.) | $zH_2O$[a] | Si/Al[b] | Yield (g)[d] |
|---|---|---|---|---|
| C1 | 65 | 173 | 2.1 | 9.5 |
| C2 | 100 | 173 | 2.1[c] | 8.7 |
| C3 | 100 | 250 | 2.0 | 6.9 |
| C4 | 100 | 500 | 1.7 | 3.8 |

Figure 5:
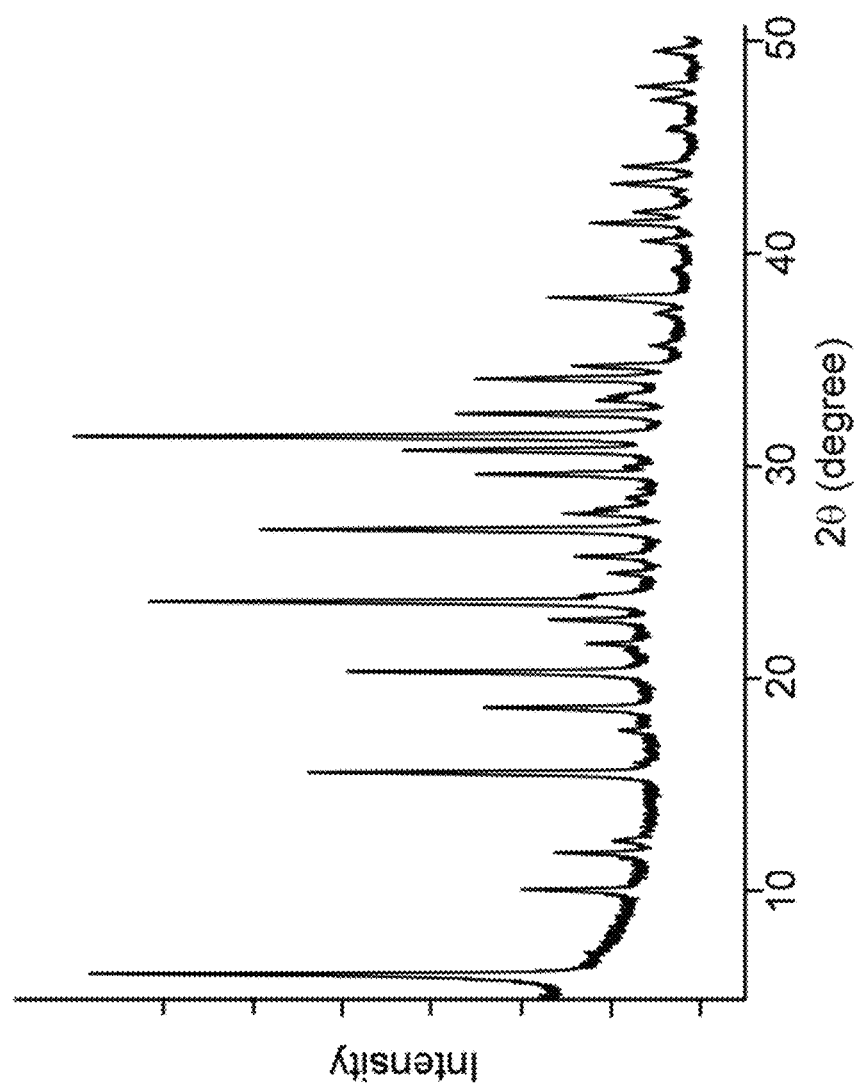
FIG. 5 shows XRD pattern of sample heated for 7 days at 100° C. with molar composition 18 $SiO_2$:3.9 $Al_2O_3$:5 $Na_2O$: 173 $H_2O$ using LUDOX SM-30 (8-nm diameter colloidal silica).

[a]Molar ratio, $18SiO_2:3.9Al_2O_3:5Na_2O:zH_2O$
[b]Average Si/Al (SAR) determined by EDS (>30 measurements)
[c]Consistent with elemental analysis (ICP-OES)
[d]Mass of zeolite per 20 mL growth solution The use of colloidal silica often results in a dispersion of core-shell particles comprised of silica-rich cores and alumina-rich shells. The alumina coating presumably stabilizes LTA formation in Si-rich regions of the phase diagram, which can be attributed to a reduced rate of silica release from the core. When Applicants exchanged the colloidal silica source from one having a nominal 23 nm diameter (LUDOX AS-40) to one having a reduced size of 8 nm (LUDOX SM-30), a shift from LTA to FAU was observed (FIG. 5). Alternatively, the use of fumed silica as the reagent did not yield a zeolite product.

Figures 3A, 3B, 3C:
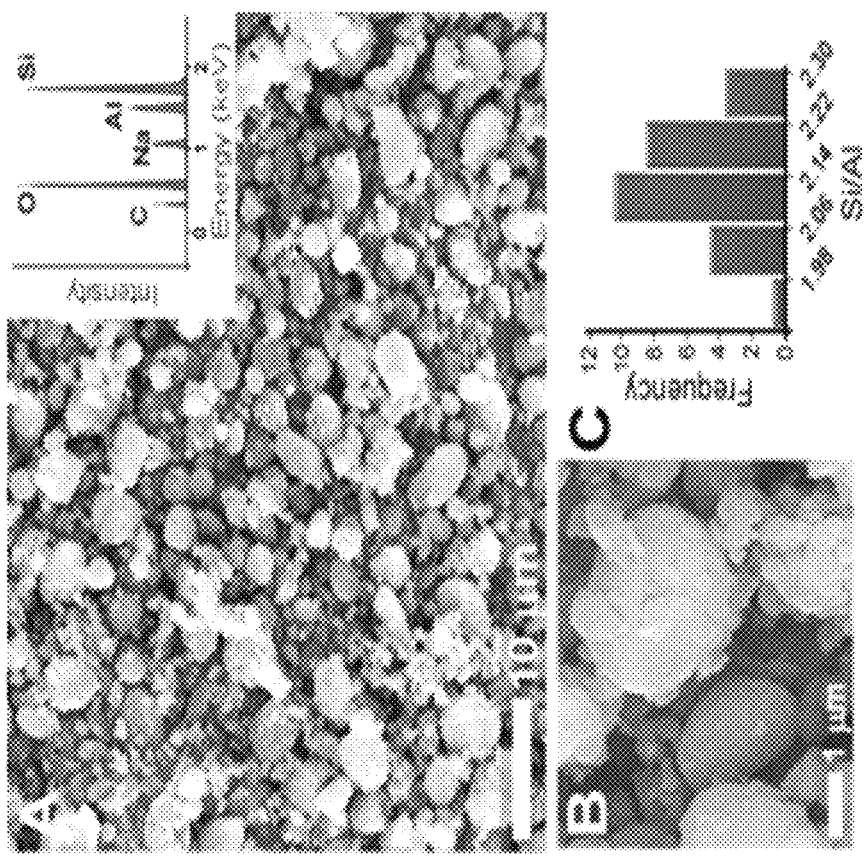
FIGS. 3A-3C show scanning electron micrographs of HOU-2. Low magnification image of the crystalline product prepared with composition C1 (Table 1) (FIG. 3A) (inset) A representative energy dispersive spectroscopy (EDS). Higher magnification SEM images reveal spheroidal morphology and a polydisperse size distribution of HOU-2 crystals (FIG. 3B). Normal distribution of Si/Al from EDS analysis of HOU-2 at more than 30 locations on the SEM sample (FIG. 3C).

HOU-2 crystals have a spheroidal morphology (FIG. 3A), which differs from the reported cubic habit in literature. Moreover, the particle size distribution of HOU-2 crystals measured by scanning electron microscopy (SEM) is broad, ranging from 100 nm to 3 μm. The SAR of HOU-2 was measured using energy dispersive spectroscopy (EDS). As shown in FIG. 3C, there is a normal distribution of SAR with an average value of 2.1, which agrees with elemental analysis performed using Inductively-Coupled Plasma Optical Emission Spectrometer (ICP-OES) of the same sample.

As previously mentioned, SAR=1 is the typical value of LTA crystals prepared in organic-free media. Prior to the discovery of HOU-2, the preparation of LTA with higher SAR required the use of OSDAs (Table 2) or a post-synthesis dealumination step. Additional methods to increase the silicon content of LTA include the use of crystal seeds or synthesis in fluoride media, while a combination of the two methods has been shown to produce LTA crystals with SAR as high as 2400. Moreover, pure silica LTA (SAR=∞) was reported in fluoride media by Corma et al., who achieved this milestone using a combination of OSDAs.

HOU-2 formation is observed at the high Si/OH region of the ternary diagram (FIG. 1), which correlates to $Na^+$-deprived growth solutions with lower alkalinity. Itani et al., studied the role of $Na^+$ ions towards the crystallization of Na-LTA. Their findings revealed that high alkali concentration facilitated zeolite nucleation by promoting the formation of aluminosilicate polymeric species. Employing growth solutions with less extra framework cations may constitute a strategy for achieving higher Si content in the zeolite framework. The rationale of using OSDAs to increase SAR in zeolite synthesis is to pack a few large organic cations within the framework channels, thereby reducing the anionic framework charge needed to compensate that of the positively-charged OSDAs. Corollaries to $Na^+$-deficient growth solutions could be invoked to explain the formation more siliceous zeolites, although the exact mechanism for HOU-2 stabilization is not well understood.

Kuhl synthesized high-silica LTA (referred to as ZK-21 and ZK-22) using a combination of sodium and tetramethylammonium as structure-directing agents. They showed that a higher silica content (SAR=1.1-1.84) led to improvements in catalytic n-hexane cracking activity and shape-selectivity towards straight-chain hydrocarbons. Kuhl also states that ion exchange from $Na^+$ to $NH_4^+$ in the preparation of H-LTA is feasible with high-silica LTA, whereas similar procedures with low-silica forms lead to the collapse of the crystal structure. Moreover, it was reported that ZK-21 and ZK-22 are hydrothermally stable during steam treatment. Collectively, these studies emphasize the benefits of synthesizing higher silica zeolites, which holds promise for the future applications of HOU-2.

In some embodiments, the present disclosure pertains to FAU-type zeolite with a SAR of at least 3.0 synthesized without the use of crystalline seeds, an OSDA, or post-synthesis treatment. Hence, in some embodiments, the present disclosure relates to Si-rich FAU zeolite produced while using industrially-relevant sources of silica and alumina.

In some embodiments, the present disclosure relates to a one-step synthesis of FAU crystals, with altered chemical properties, that is economical.

In some embodiments, the present disclosure relates to a one-step method for the synthesis of FAU-type zeolites. In some embodiments, the method comprises synthesizing zeolites without the use of organic structure-directing agents. In some embodiments, the method comprises synthesizing zeolite without any post-synthesis dealumination. In some embodiments, the method comprises synthesizing zeolite without the use of crystal seeds. In some embodiments, the method comprises preparing a zeolite growth solution comprising an alumina source and a hydroxide source. In some embodiments such a method further comprises adding a silica source to the zeolite growth solution to form an initial gel mixture. In some embodiments, such a method comprises using a cation as the extra framework counterion. In some embodiments, the cation comprises alkali metals. In some embodiments, the extra framework cation is $Na^+$. In some embodiments, the method comprises using an initial gel mixture comprising Si/OH of a molar ratio greater than about 1.5. In some embodiments, the method comprises crystallization of the initial gel mixture. In some embodiments, the step of crystallization comprises heating the initial gel mixture at about 100° C. for at least 1 day. In some embodiments, the step of crystallization comprises heating the initial gel mixture at about 100° C. for about 3 days. In some embodiments, the step of crystallization comprises heating the initial gel mixture at about 140° C. for at least 1 day. In some embodiments, the step of crystallization comprises heating the initial gel mixture at about 140° C. for about 3 days. In some embodiments the method comprises collecting products formed, where the products comprise of crystalline material and amorphous material. In some embodiments, the method comprises isolating the zeolites formed from the crystalline products. In some embodiments, the synthesized FAU-type zeolite has silicon to aluminum ratio (SAR) of at least 3.

In some embodiments, such a method comprises using growth solutions with low alkalinity (i.e., Si/OH≥1.5), low water content, and a higher temperature (100° C.). In some embodiments, the method comprises using an initial gel mixture comprising Si/OH of a molar ratio greater than about 1.5. In some embodiments, the method comprises crystallization of the initial gel mixture. In some embodiments, the step of crystallization comprises heating the initial gel mixture at about 100° C. for about 3-7 days. In some embodiments, the silica is colloidal silica. In some embodiments, the colloidal silica has a size ranging from about 8 nm to about 25 nm.

In some embodiments, the method further comprises incorporation of a rare earth metal in the synthesized zeolite. In some embodiments, the rare earth metal is cerium or lanthanum. In some embodiments, the size of the zeolites synthesized by the methods disclosed herein ranges from about 1-5 μm.

In some embodiments of the present disclosure, the silica is selected from the group consisting of fumed silica, sodium silicate, tetraethylorthosilicate (TEOS), colloidal silica, natural silicon dioxide-containing clays and minerals, or zeolites. In some embodiments, the silica is colloidal silica.

In some embodiments, the alumina source is selected from the group consisting of aluminum sulfate, aluminum isopropoxide, aluminum metal, alumina, natural $Al_2O_3$ containing clays and minerals, sodium aluminate, or zeolites (using crystal phase transformation to LTA). In some embodiments, the alumina source is sodium aluminate.

Applications and Advantages

Conventional synthesis of FAU type zeolites without organic structure-directing agents (OSDAs), results in silicon-to-aluminum (SAR) ratio of 2.5 or lower. Synthesis using OSDAs and post-synthesis treatments can yield SAR ratios greater than 2.5 but have an increased cost and can lead to undesired outcomes, e.g., formation of defects and mesopores that can lead to the collapse of the crystal structure. The methods disclosed herein result in the production of FAU-type crystals with a SAR of at least 3.0 without the use of OSDAs or post-synthesis treatment. Hence, the methods disclosed herein provide an economic advantage and are commercially attractive. Moreover, the methods disclosed herein lead to the formation of a more siliceous product, which leads to increased hydrothermal stability of the zeolite, resulting in a product with tunable properties and increased lifetime that is more suitable for commercial applications.

Additional Embodiments

Reference will now be made to more specific embodiments of the present disclosure and experimental results that provide support for such embodiments. However, Applicants note that the disclosure below is for illustrative purposes and is not intended to limit the scope of the claimed subject matter in any way.

Example 1

Zeolite Crystallization

LUDOX AS-40 colloidal silica (40%), LUDOX SM-30 colloidal silica (30%), silica fumed powder (0.007 μm), and sodium hydroxide (98%) were purchased from Sigma Aldrich. Sodium aluminate (technical grade) was purchased from Alfa Aesar. All reagents were used as received without further purification. All solutions were prepared using deionized water (DI, 18.2 MΩ) purified with an Aqua Solutions purification system (RODI-C-12A).

Zeolite growth solutions with molar compositions x $SiO_2$:y $Al_2O_3$:10 NaOH:z $H_2O$ were prepared by first mixing sodium aluminate and sodium hydroxide in DI water. The solutions were stirred for 1 hour prior to the addition of the silica source. For these studies, LUDOX AS-40 was used unless otherwise specified. The mixture was aged for 24 hours at room temperature and then transferred to Teflon-lined Parr stainless steel autoclaves. Syntheses were performed in a ThermoFisher Precision oven at either 65° C. or 100° C. For these studies, the nominal time for hydrothermal treatment was 7 days (unless otherwise specified). The products were collected by three cycles of centrifugation and washing (DI water) using a Sorvall RC-5B Refrigerated Superspeed centrifuge (13,000 rpm for 45 min). Isolation of the crystalline product from amorphous matrix was performed by filtration using a fluted VWR 410 qualitative filter membrane. Samples were dried in air under the fume hood at ambient conditions.

Example 2

Characterization

Zeolite samples were characterized by powder X-ray diffraction (XRD), scanning electron microscopy (SEM), energy dispersive X-ray spectroscopy (EDS), and inductively-coupled plasma optical emission spectrometry (ICP-OES). XRD patterns were collected on a Siemens D5000 X-ray diffractometer using CuKα radiation ($\lambda$=1.54 Å) with Ni filter. SEM microscopy was conducted with a FEI-235 Dual-Beam Focused Ion Beam microscope. Powder samples were mounted to an aluminum stub using a conductive carbon tape and coated with gold prior to analysis. EDS was conducted with a JEOL JSM 6330F Field Emission scanning electron microscope. ICP-OES was performed at the UH ICP Analytical Laboratory and Agilent Facility Center (University of Houston).

Summary of LTA Framework Materials in the Literature

TABLE 2

Representative aluminosilicate materials with an LTA topology and their reported SAR values

| LTA Zeolites | SAR | Reference |
|---|---|---|
| Linde Type A (zeolite A) | 1.0 | J. Am. Chem. Soc., 78, 5972-5977 (1956) |
| High silica LTA Materials (prepared with OSDA, by seeding and/or fluoride) | | |
| ITQ-29 | ∞ | Nature, 431, 287-290 (2004) |
| UZM-9 | 3.5-6 | Stud. Surf. Sci. Catal., 154B, 364-372 |
| ZK-4 | 1.0-1.7 | Inorg. Chem., 5, 1537-1539 (1966) |
| ZK-21/22 | 1.1-1.84 | Inorg. Chem., 10, 2488-2495 (1971) |
| Zeolite Alpha | 3 | U.S. Pat. No. 4,191,663 |
| LTA (by seeding) | 100-2400 | Chem. Mater., 19, 652-654 (2007) |

Example 3

Powder X-Ray Diffraction (XRD)

Figure 4:
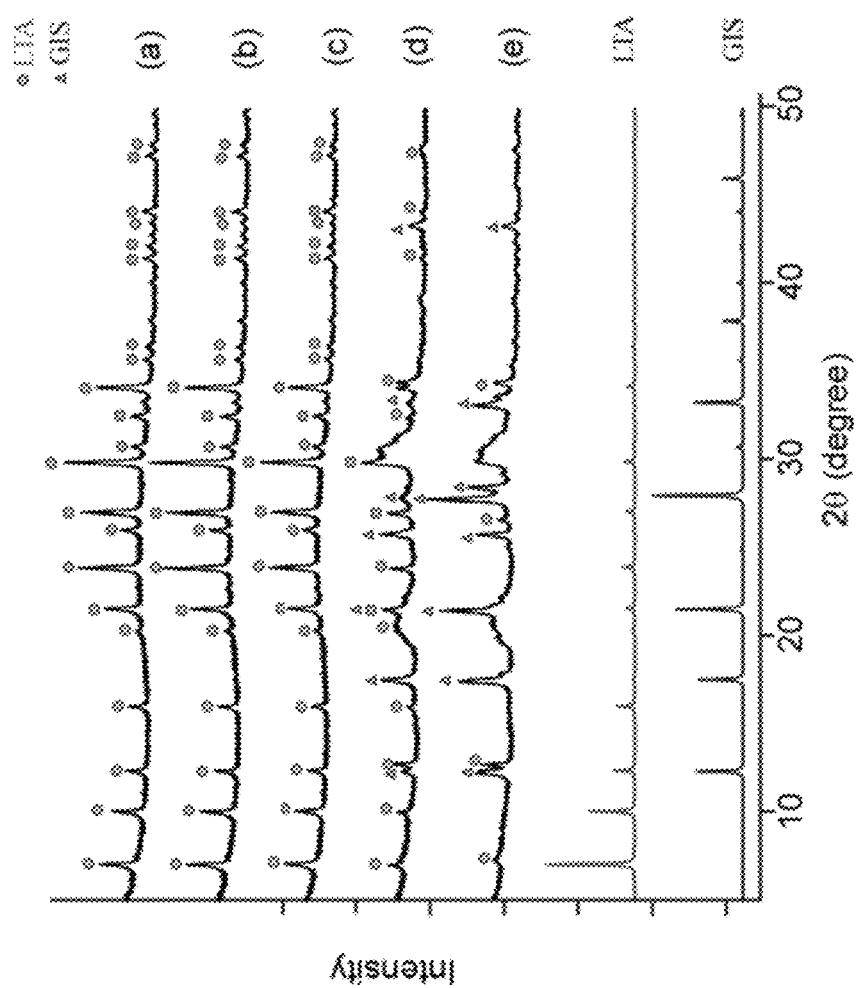
FIG. 4 shows XRD patterns of samples heated at 100° C. with molar composition 18 $SiO_2$:3.9 $Al_2O_3$:5 $Na_2O$:173 $H_2O$. Samples were isolated from the synthesis solution at different crystallization times: (a) 1 day; (b) 3 days; (c) 5 days; (d) 8 days; and (e) 14 days. Simulated LTA and GIS patterns from IZA database are also included for identification of the phases present in the sample.

HOU-2 (Na-LTA) formation was studied at varying crystallization time at a synthesis temperature of 100° C. in order to monitor the evolution of the crystalline phase and any structural transformations to polymorphs at prolonged time. FIG. 4 shows the XRD patterns of zeolites extracted at various times from a growth solution with molar composition 18 $SiO_2$:3.9 $Al_2O_3$:5 $Na_2O$:173 $H_2O$. This study clearly shows the phase transformation from HOU-2 to gismondine (GIS type) after 7 days of heating.

The effect of silica source on HOU-2 formation was tested for three different reagents. The particle size of the amorphous silica precursor was altered by switching to a smaller colloidal silica source (LUDOX SM-30), which has an average diameter of 8 nm. Here Applicants followed the same procedure that was used to prepare HOU-2 in the presence of LUDOX AS-40 (i.e., 23 nm diameter silica particles). FIG. 5 displays the XRD pattern of the FAU crystal phase that was obtained using LUDOX SM-30.

Example 4

Measuring the Chemical Composition of HOU-2
Energy Dispersive Spectroscopy (EDS)

Figure 6:
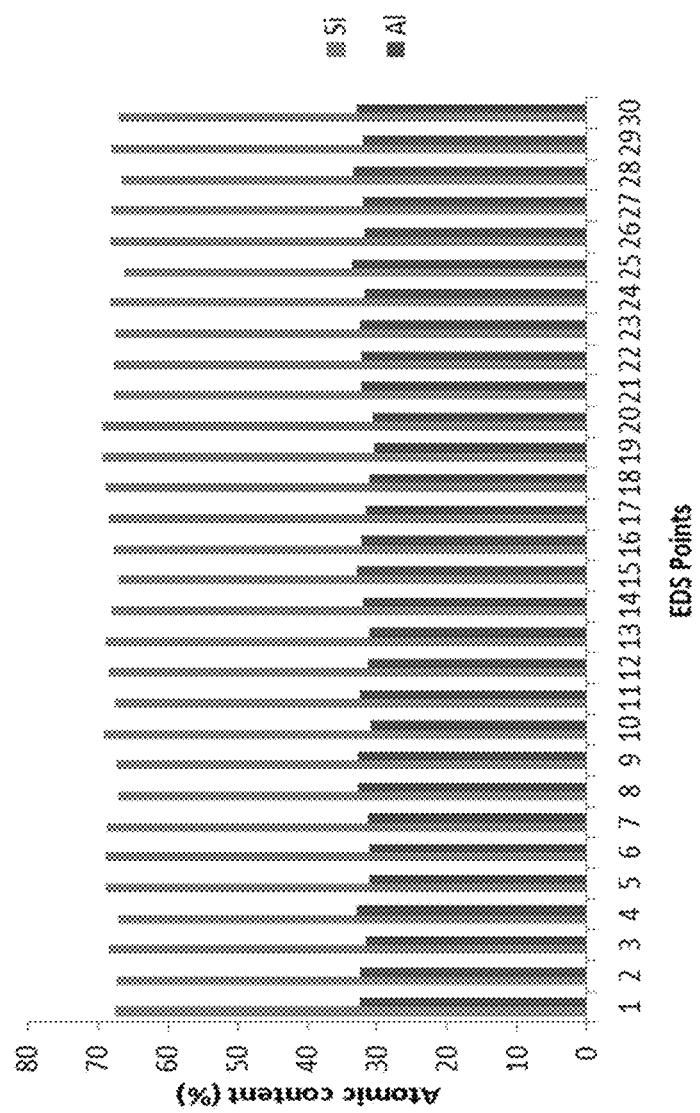
FIG. 6 shows energy dispersive spectroscopy (EDS) measurements of the Si (brown) and Al (red) content of a HOU-2 sample that was heated for 7 days at 100° C. with molar composition 18 $SiO_2$:3.9 $Al_2O_3$:5 $Na_2O$:173 $H_2O$. The average SAR for this experiment is 2.14±0.09.
Figure 7:
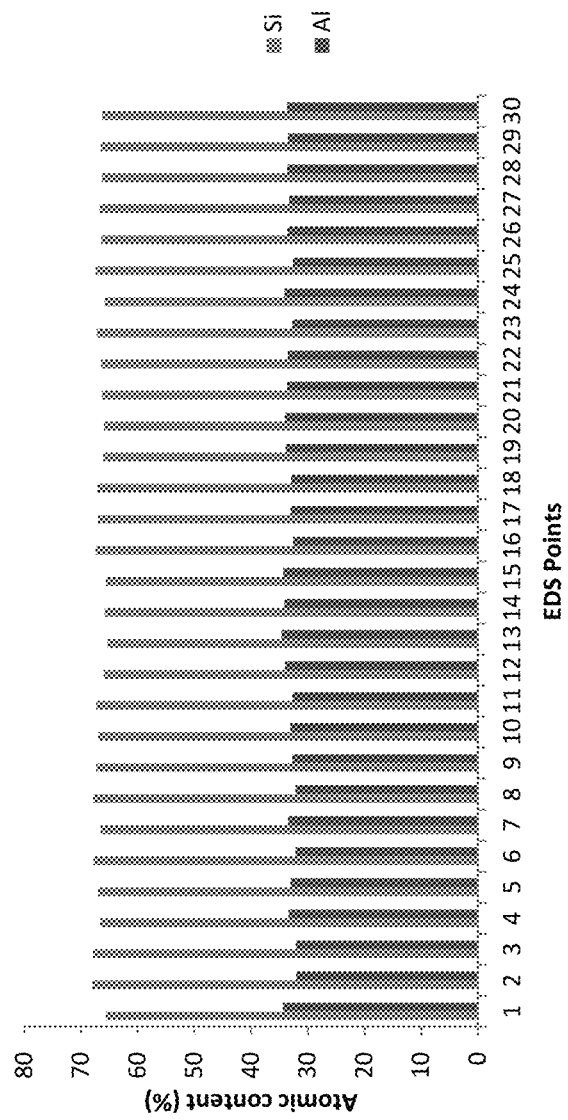
FIG. 7 shows energy dispersive spectroscopy (EDS) measurements of the Si (brown) and Al (red) content of a HOU-2 sample that was heated for 7 days at 100° C. with molar composition 18 $SiO_2$:3.9 $Al_2O_3$:5 $Na_2O$:250 $H_2O$. The average SAR for this experiment is 2.0±0.1.
Figure 8:
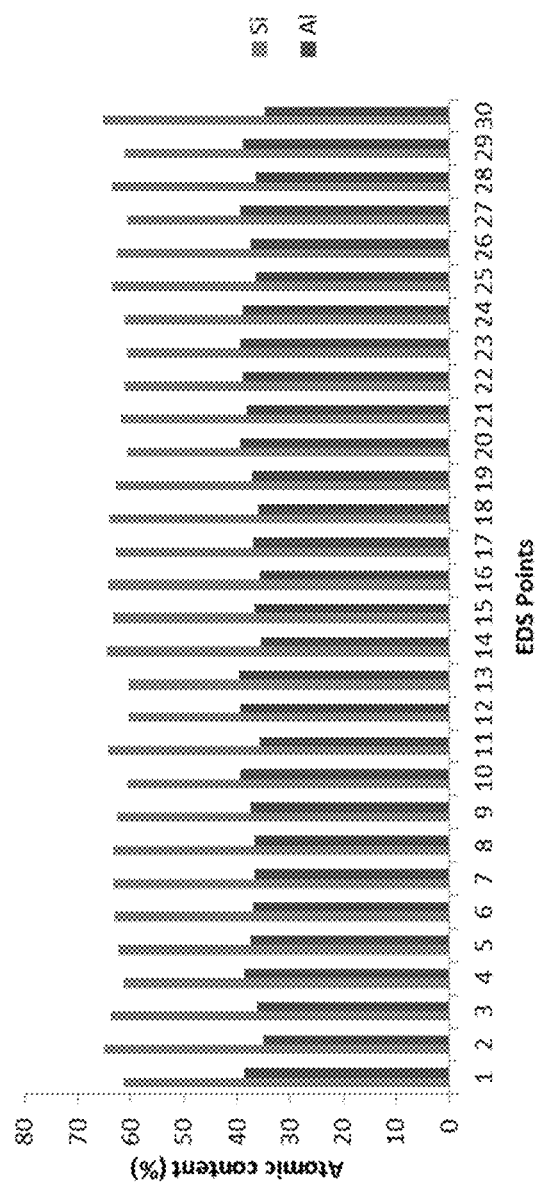
FIG. 8 shows energy dispersive spectroscopy (EDS) measurements of the Si (brown) and Al (red) content of a HOU-2 sample that was heated for 7 days at 100° C. with molar composition 18 $SiO_2$:3.9 $Al_2O_3$:5 $Na_2O$:500 $H_2O$. The average SAR for this experiment is 1.7±0.2.

The silicon-to-aluminum molar ratio (SAR) of the samples was determined using SEM-EDS. At least 30 points from five different imaging areas across the sample were monitored for their Si and Al content. FIG. 6-FIG. 8 show that there is very little variation in measured Si and Al content for each sample. The samples were prepared at different water content using growth solutions with molar composition 18 $SiO_2$:3.9 $Al_2O_3$:5 $Na_2O$:z $H_2O$ (z=173, 250, and 500).

Example 5

Elemental Analysis (ICP-OES)

ICP-OES (Inductively-coupled plasma optical emission spectrometry) analysis was conducted to benchmark the accuracy of EDS measurements. The latter is a surface-biased technique wherein the X-rays only penetrate a certain distance into the zeolite crystals. In order to obtain the bulk SAR for HOU-2 (i.e., average composition of the entire crystal), we prepared a sample for ICP-OES using the C2 composition (18 $SiO_2$:3.9 $Al_2O_3$:5 $Na_2O$:173 $H_2O$) heated for 7 days at 100° C. Table 3 shows the results of the analysis performed at the UH ICP Analytical Laboratory and Agilent Facility Center (University of Houston). The values obtained by both techniques are identical.

TABLE 3

Si and Al content of HOU-2 obtained by ICP-OES

| Si (ppm) | 242650 |
|---|---|
| Al (ppm) | 108700 |
| Si/Al (molar) | 2.14 |

Example 7

Figure 9:
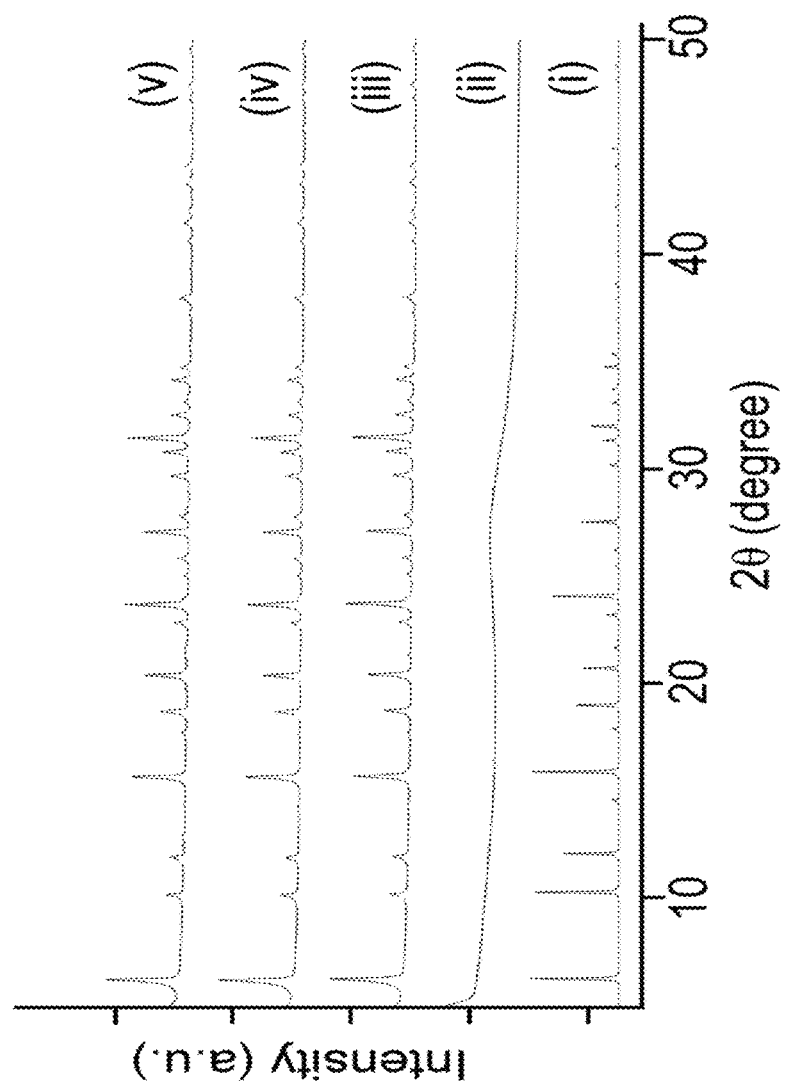
FIG. 9 depicts X-ray diffraction (XRD) patterns of solid products from synthesis conditions of 15Si:2.5 Al:10 NaOH: 200 $H_2O$ for various heating times at 100 and 140° C. The reagents used in this experiment were Ludox AS-40 and sodium aluminate. The reference pattern for USY (i) has been adjusted so peaks at positions 2θ>10° are of greater intensity than usual to ease visual comparison. The patterns shown are for samples crystallized at the following conditions: (ii) 100° C., 1 day; (iii) 100° C., 3 days; (iv) 100° C., 5 days; and (v) 100° C., 7 days.

Multiple reagents were tested and compositions of the growth solutions were systematically varied to determine the conditions required for the formation of pure crystalline FAU. In some embodiments, the conditions comprises synthesising FAU-type zeolite using growth solutions of a molar ratio of 15 Si:2.5 Al:10 NaOH:200 H2O, using a crystallization temperature of 100° C. for times ranging from 3 to 7 days (FIG. 9). Energy dispersive spectroscopy (EDS) analysis of the sample heated for 7 days also revealed the final crystalline product had an average SAR of 3.0.

Example 8

Figure 10:
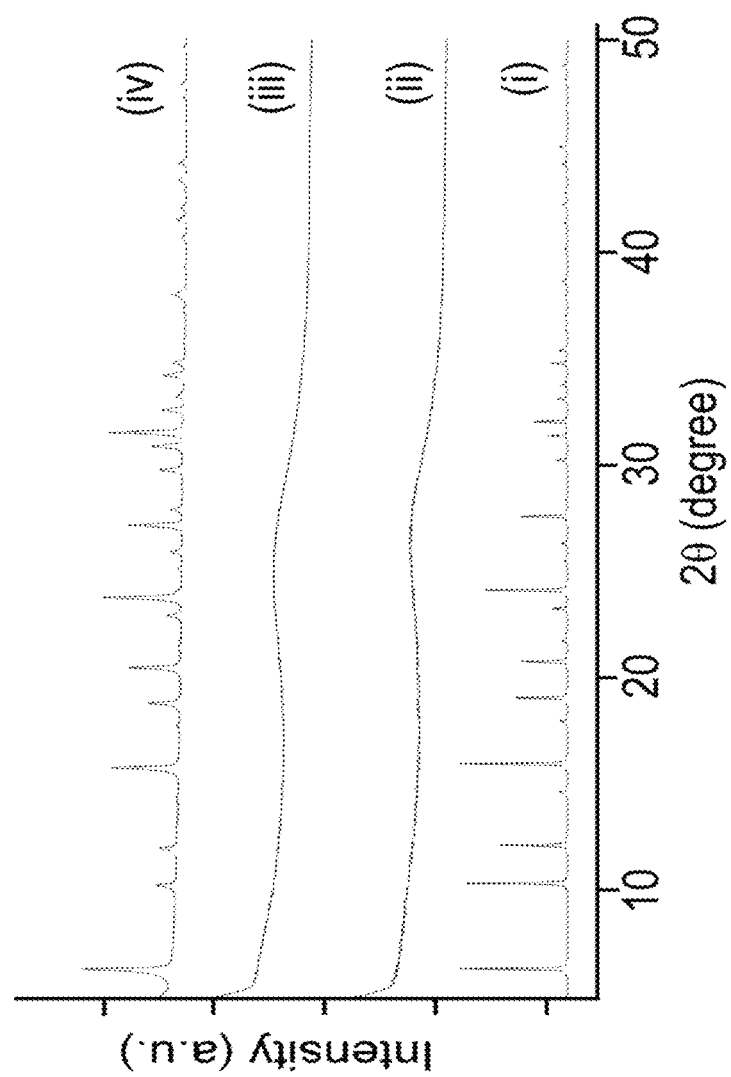
FIG. 10 shows X-ray diffraction patterns of solid products from synthesis conditions of 15 Si:2.5 Al:10 NaOH:200 $H_2O$ compared to a reference USY pattern (i). The reference pattern has been adjusted so peaks at positions 2θ>10° are of greater intensity than usual to ease visual comparison. These products were crystallized at 100° C. for 7 days using Ludox AS-40 and varied alumina sources: (ii) aluminum hydroxide; (iii) aluminum sulfate; and (iv) sodium aluminate.
Figure 11:
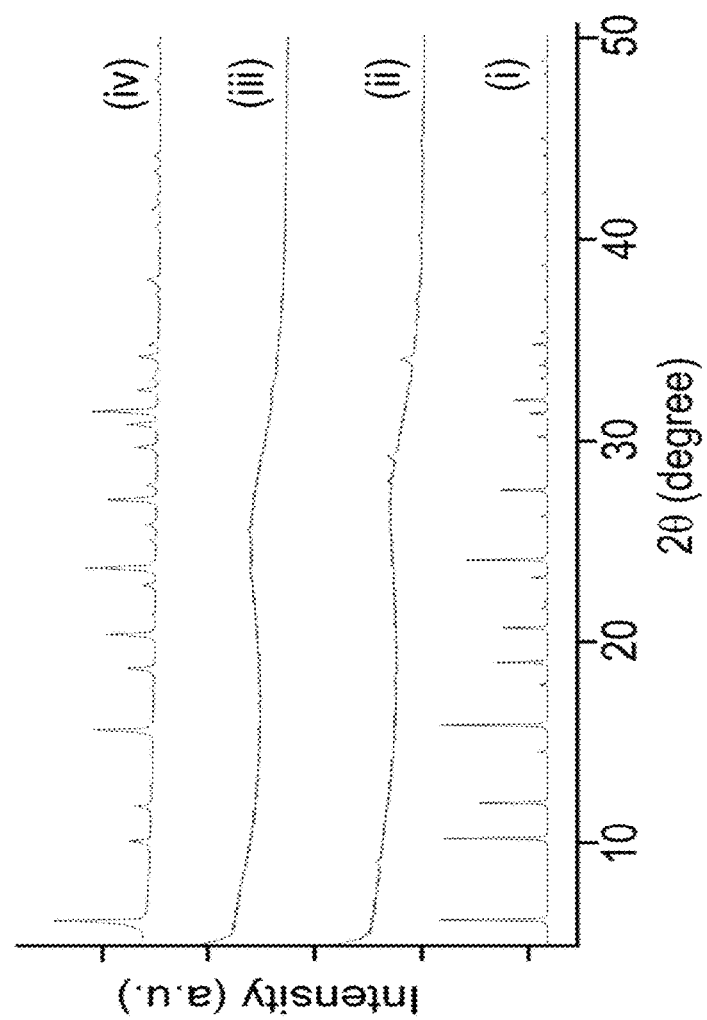
FIG. 11 shows X-ray diffraction patterns of solid products from synthesis conditions of x Si:y Al:10 NaOH:z $H_2O$ compared to a reference USY pattern (i). The reference pattern has been adjusted so peaks at positions 2θ>10° are of greater intensity than usual to ease visual comparison. These products were crystallized at 100° C. for 7 days using Ludox SM-30 and varied alumina sources: (ii) aluminum hydroxide; (iii) aluminum sulfate; and (iv) sodium aluminate (e.g., HOU-3 sample).
Figure 12:
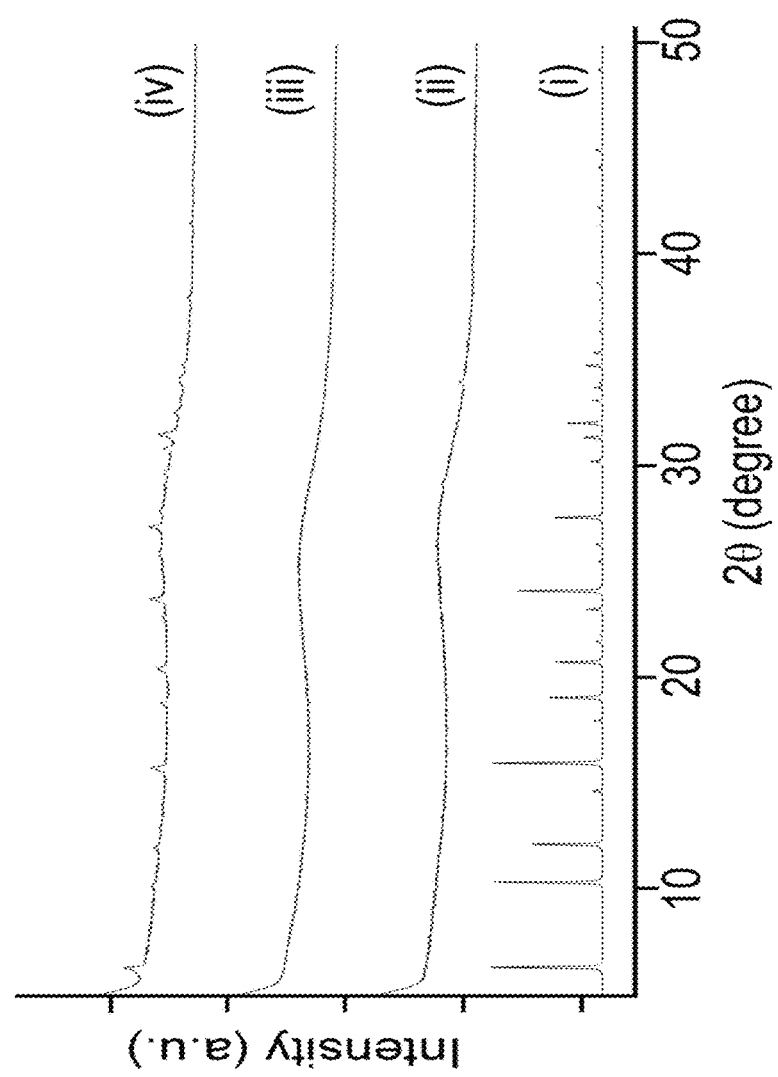
FIG. 12 shows X-ray diffraction patterns of solid products from synthesis conditions of 15 Si:2.5 Al:10 NaOH:200 H2O compared to a reference USY pattern (i). The reference pattern has been adjusted so peaks at positions 2θ>10° are of greater intensity than usual to ease visual comparison. These products were crystallized at 100° C. for 7 days using fumed silica (Cab-O-Sil) and varied alumina sources: (ii) aluminum hydroxide; (iii) aluminum sulfate; and (iv) sodium aluminate.
Figure 13:
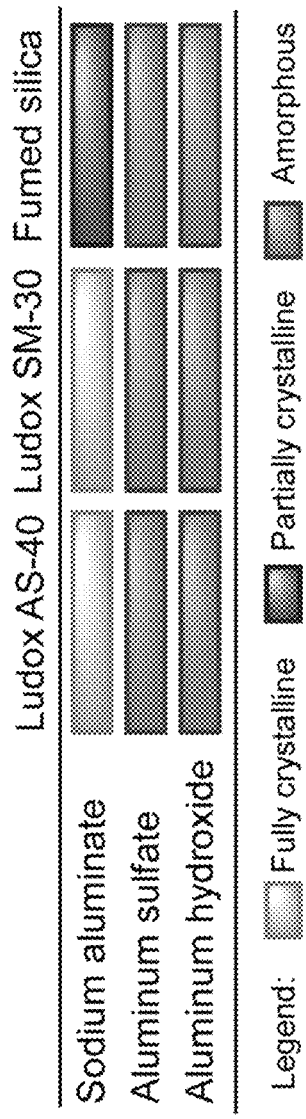
FIG. 13 shows products of syntheses from an initial synthesis composition of 15 Si:2.5Al:10 NaOH:200 $H_2O$ heated at 100° C. for 3 days using different combinations of silica and alumina reagents.

Additional syntheses were performed in which the silica and/or alumina sources were varied to ascertain the robustness of this synthesis protocol. FIG. 13 shows the crystalline phases formed using a reaction mixture of molar ratio 15 Si:2.5 Al:10 NaOH:200 H2O using Ludox AS-40 (25 nm colloidal silica), Ludox SM-30 (8 nm colloidal silica), and Cab-O-Sil M5 fumed silica as silica sources; and for the alumina sources we tested sodium aluminate, aluminium sulphate, and aluminium hydroxide as alumina sources. Syntheses employing sodium aluminate as the alumina source yielded a partially crystalline FAU product. Replacing this reagent with aluminium sulphate or aluminium hydroxide resulted in an amorphous material. Changes in alumina source can have a pronounced effect on zeolite crystallization, often leading to amorphous material. When sodium aluminate was used as the alumina source, FAU type zeolite was produced with both colloidal silica sources after heating at 100° C. for 3 days. The same procedure using a combination of fumed silica and sodium aluminate yielded partially crystalline FAU. The XRD patterns for data in FIG. 13 are provided in the following figures: Ludox AS-40 with varying Al sources are reported in FIG. 10; Ludox SM-30 with varying Al sources are reported in FIG. 11; and fumed silica with varying Al sources are reported in FIG. 12.

FIG. 13. Products of syntheses from an initial synthesis composition of 15 Si:2.5Al:10 NaOH:200 H$_2$O heated at 100° C. for 3 days using different combinations of silica and alumina reagents.

Example 9

Preparation of zeolites with fumed silica is often preferred since it is a relatively inexpensive reagent, and therefore, it is commonly used in commercial synthesis. A detailed time-elapsed study of FAU crystallization using fumed silica and sodium aluminate as the reagents was performed. When the heating time for crystallization was increased to 5 and 8 days, a fully crystalline HOU-3 (FAU-type zeolite) without apparent impurities, was obtained (FIG. 14).

Figure 14:
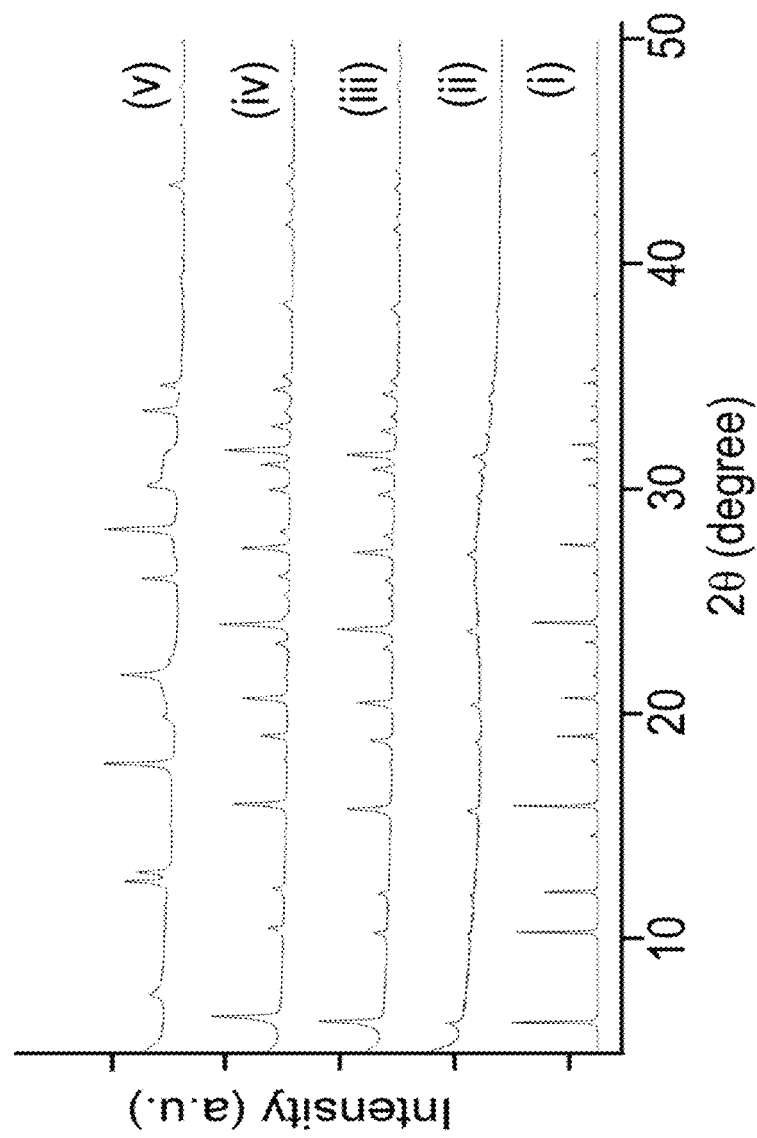
FIG. 14 shows X-ray diffraction patterns of solid products from synthesis conditions of 15Si:2.5 Al:10 NaOH:200 $H_2O$ for various heating times at 100 and 140° C. The reagents used in this experiment were fumed silica (Cab-O-Sil) and sodium aluminate. The reference pattern for USY (i) has been adjusted so peaks at positions 2θ>10° are of greater intensity than usual to ease visual comparison. The patterns shown are for samples crystallized a the following conditions: (ii) 100° C., 3 days; (iii) 100° C., 5 days; (iv) 100° C., 8 days; and (v) 140° C., 3 days.

The synthesis parameters were varied to determine the practical range of modifying conditions for HOU-3 without compromising its SAR and when the temperature was increased to 140° C. an undetermined crystalline material with an XRD pattern that could not be indexed with any known zeolite crystal was obtained (FIG. 14).

Figure 15:
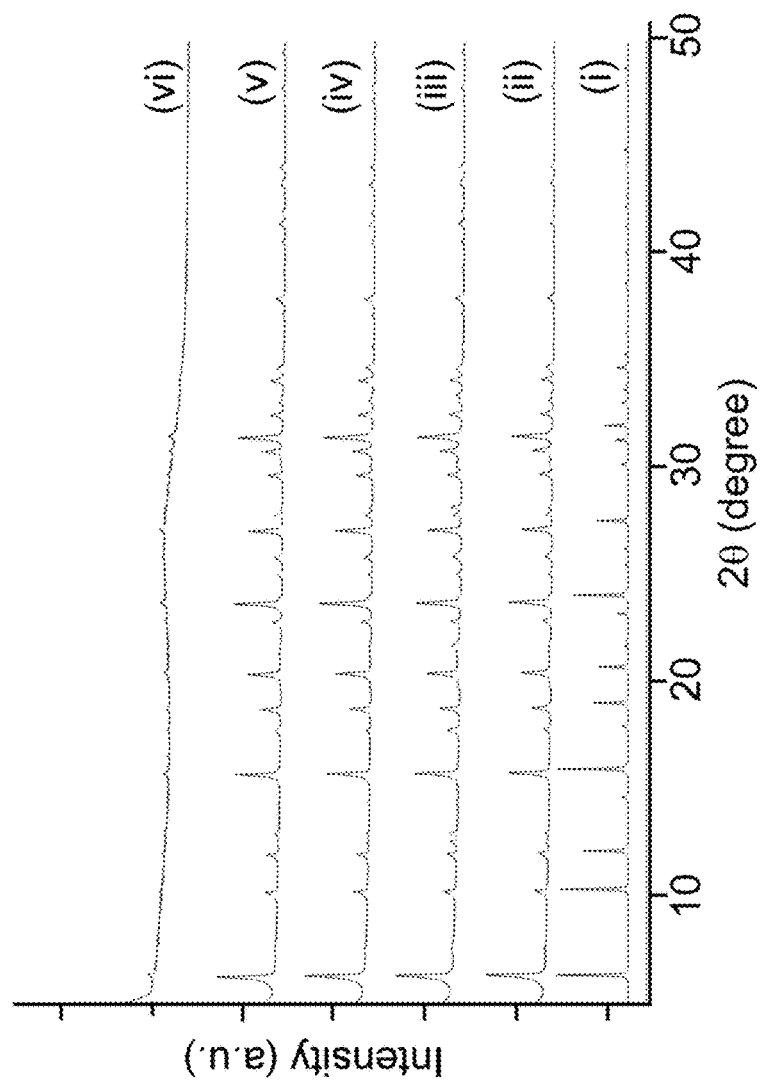
FIG. 15 shows X-ray diffraction patterns of solid products from synthesis conditions of HOU-3 (FAU-type zeolite) with molar composition x Si:y Al:10 NaOH:200 $H_2O$ compared to a reference USY pattern (i). The reference pattern has been adjusted so peaks at positions 2θ>10° are of greater intensity than usual to ease visual comparison. These products were crystallized at 100° C. for 7 days using Ludox AS-40 and sodium aluminate as silica and alumina sources, respectively. Compositions tested are: (ii) x=15, y=1.88; (iii) x=15, y=2.14; (iv) x=15, y=2.50; (v) x=16, y=2.67; (vi) x=17, y=2.83.

The effect of growth solution composition was also assessed (Table 4) to identify the condition(s) capable of maximizing the SAR of HOU-3 (high-silica FAU). Focusing on the use of fumed silica, the highest SAR material was obtained using a molar composition of 15 Si:2.50 Al:10 NaOH:200 H$_2$O, which yielded pure FAU-type zeolite with an SAR of 3. The XRD patterns for selected compositions are shown in FIG. 15.

conditions that may be easier to process (i.e., less viscous solution), the water content of the growth solution was systematically increased. Solid-state transformations of zeolites are possible and this may be a desirable form of the reaction. Applicants have demonstrated that the water content can be altered in a manner that reduces the viscosity of the growth solution, but does not significantly affect the final composition of the crystalline product.

TABLE 5

Silicon-to-aluminum ratios reported previously, the present disclosure, and commercially available products based on their use of OSDAs, seeds, and post-synthesis dealumination.

| Reference | Si/Al | OSDA | Seed | Dealumination |
|---|---|---|---|---|
| U.S. Pat. No. 2,882,244[13] | 1.50 | | | |
| U.S. Pat. No. 3,690,823[15] | 2.50 | | | |
| U.S. Pat. No. 4,576,807[35] | 2.65 | | X | |
| U.S. Pat. No. 8,778,824[36] | 2.75 | | | |
| U.S. Pat. No. 3,574,538 | 2.95 | | X | |
| Present work | 3.00 | | | |
| U.S. Pat. No. 3,691,099[37] | 3.23 | | | X |
| U.S. Pat. No. 4,965,059[21] | 3.50 | X | | |
| U.S. Pat. No. 4,931,267[20] | 5.58 | X | | |
| U.S. Pat. No. 3,640,681[24] | 8.35 | | | X |
| Zeolyst (commercial)[38] | 40.00 | N/A | N/A | N/A |

The common FCC catalysts are solid-acid forms of FAU zeolites that contain a degree of rare-earth (RE) metal exchange. The degree of RE exchange in a typical RE-USY catalyst is ca. 3-4 wt %, which is lower than RE-Y catalysts (ca. 10-20%). The reduced RE exchange for USY is attributed to conventional techniques used to raise the SAR of USY (e.g., post-synthesis acid treatment), which often result in a partial collapse of the framework structure. This places limitations of the amount of rare earth ions that can be incorporated into the zeolite. The synthesis of high-silica HOU-3 (H-FAU) opens possibilities for preparing H-FAU materials with increased rare earth element occlusion (e.g., cerium and lanthanum). This could be accomplished through post-synthesis ion exchange or by including the rare earth elements in the original synthesis growth solution as a one-step process.

TABLE 4

Summary of the conditions tested following the molar ratio x Si:y Al:10 NaOH:z H$_2$O for FAU zeolite synthesis using sodium aluminate as the aluminium source.

| Si/Al | Si/OH | Si | Al | H$_2$O | Si Source | Temp (° C.) | Time (day) | Phase (product)$^a$ |
|---|---|---|---|---|---|---|---|---|
| 8.00 | 1.5 | 15 | 1.88 | 200 | Ludox AS-40 | 100 | 7 | FAU/(Unknown$^b$) |
| 7.01 | 1.5 | 15 | 2.14 | 200 | Ludox AS-40 | 100 | 7 | FAU/(Unknown$^b$) |
| 6.00 | 1.5 | 15 | 2.50 | 200 | Ludox AS-40 | 100 | 7 | FAU |
| 6.00 | 1.5 | 15 | 2.50 | 150 | Ludox AS-40 | 100 | 7 | FAU |
| 5.99 | 1.6 | 16 | 2.67 | 200 | Ludox AS-40 | 100 | 7 | FAU |
| 6.01 | 1.7 | 17 | 2.83 | 200 | Ludox AS-40 | 100 | 7 | Am/(FAU) |
| 6.00 | 1.5 | 15 | 2.50 | 200 | Fumed Silica | 100 | 3 | Am/(FAU) |
| 6.00 | 1.5 | 15 | 2.50 | 200 | Fumed Silica | 100 | 5 | FAU |
| 6.00 | 1.5 | 15 | 2.50 | 200 | Fumed Silica | 100 | 8 | FAU |
| 6.00 | 1.5 | 15 | 2.50 | 200 | Fumed Silica | 140 | 3 | FAU/(Unknown) |
| 6.00 | 1.5 | 15 | 2.50 | 200 | Ludox SM-30 | 100 | 3 | FAU |

$^a$Products in listed in parentheses are minor components
$^b$Unknown products have not yet been identified Products in listed in parentheses are minor components. Unknown products have not yet been identified.

Example 10

When using fumed silica the initial growth mixture tends to form either a viscous gel or a solid. To investigate From the foregoing description, one skilled in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure, which is defined in the following claims.

What is claimed is:

1. A one-step organic-free method for the synthesis of LTA-type zeolites comprising:
    preparing a zeolite growth solution comprising an alumina source and a hydroxide source;
    adding a silica source to the zeolite growth solution to form an initial gel mixture;
    crystallization of the initial gel mixture;
    collecting products formed; and
    isolating the zeolites formed from the crystalline products, wherein the synthesis of the zeolites is without the use of organic structure-directing agents, wherein the synthesis of the zeolite is without the use of crystal seeds, wherein the silicon-to-hydroxide ratio in the initial gel mixture is greater than about 1 and less than about 1.5, and wherein the synthesized zeolite has a silicon-to-aluminum ratio of at least 2:1.

2. The method of claim 1 further comprising adding a cation as an extra-framework counterion in the zeolite growth solution.

3. The method of claim 2, wherein the extra-framework cation is an alkali metal.

4. The method of claim 2, wherein the extra-framework cation is $Na^+$.

5. The method of claim 1, wherein the alumina source is selected from a the group consisting of aluminum sulfate, aluminum isopropoxide, aluminum metal, alumina, natural $Al_2O_3$ containing clays and minerals, sodium aluminate, and zeolites using crystal phase transformation to LTA.

6. The method of claim 1, wherein the alumina source is sodium aluminate.

7. The method of claim 1, wherein the hydroxide source is sodium hydroxide.

8. The method of claim 1, wherein the silica source is selected from the group consisting of fumed silica, sodium silicate, tetraethylorthosilicate (TEOS), colloidal silica, natural silicon dioxide-containing clays and minerals, or zeolites.

9. The method of claim 1, wherein the silica source is colloidal silica.

10. The method of claim 9, wherein the colloidal silica has a size ranging from about 8 nm to about 25 nm.

11. The method of claim 1, wherein the step of crystallization of the initial gel mixture comprises heating the initial gel mixture at temperatures ranging from about 25° C. to about 290° C. for at least 1 day.

12. The method of claim 1, wherein the zeolites are synthesized without the use of post-synthesis dealumination.

13. The method of claim 1, wherein the zeolites have a cubic morphology.

14. The method of claim 1, wherein the zeolites have a spheroidal morphology.

15. The method of claim 1, wherein the size of the zeolites ranges from about 1 nm to about 5 μm.

16. A one-step organic-free method for the synthesis of FAU-type zeolites comprising:
    preparing a zeolite growth solution comprising an alumina source and a hydroxide source;
    adding a silica source to the zeolite growth solution to form an initial gel mixture;
    heating the initial gel mixture from about 25° C. to about 140° C.;
    collecting products formed; and
    isolating the zeolites formed from the crystalline products, wherein the synthesis of the zeolites is without the use of organic structure-directing agents, wherein the synthesis of the zeolite is without the use of crystal seeds, wherein the silicon to hydroxide ratio in the initial gel mixture is at least 1.5, and wherein the synthesized zeolite has a silicon-to-aluminum ratio of at least 3:1.

17. The method of claim 16 further comprising adding a cation as an extra-framework counterion in the zeolite growth solution.

18. The method of claim 17, wherein the extra-framework cation is an alkali metal.

19. The method of claim 18, wherein the extra-framework cation is $Na^+$.

20. The method of claim 16, wherein the method further comprises incorporation of a rare earth metal in the synthesized zeolite.

21. The method of claim 16, wherein the alumina source is selected from a the group consisting of aluminum sulfate, aluminum isopropoxide, aluminum metal, alumina, natural $Al_2O_3$ containing clays and minerals, sodium aluminate, and zeolites using crystal phase transformation to LTA.

22. The method of claim 16, wherein the alumina source is sodium aluminate.

23. The method of claim 16, wherein the hydroxide source is sodium hydroxide.

24. The method of claim 16, wherein the silica source is selected from the group consisting of fumed silica, sodium silicate, tetraethylorthosilicate (TEOS), colloidal silica, natural silicon dioxide-containing clays and minerals, or zeolites.

25. The method of claim 16, wherein the silica source is colloidal silica.

26. The method of claim 25, wherein the colloidal silica has a size ranging from about 8 nm to about 25 nm.

27. The method of claim 16, wherein the silica is fumed silica.

28. The method of claim 16, wherein the step of crystallization of the initial gel mixture comprises heating the initial gel mixture initial gel mixture at a temperature of at least 100° C. for at least 1 day.

* * * * *